United States Patent [19]
Plunk

[11] Patent Number: 5,560,320
[45] Date of Patent: Oct. 1, 1996

[54] PLAY AND CHEW TOY FOR DOGS

[75] Inventor: Kenneth G. Plunk, Dallas, Tex.

[73] Assignee: Pet Avenue, Inc., Dallas, Tex.

[21] Appl. No.: 414,613

[22] Filed: Mar. 31, 1995

[51] Int. Cl.$^6$ ............................................. A01K 15/02
[52] U.S. Cl. ............................................. 111/709
[58] Field of Search .......................... 119/707, 708, 119/709, 710

[56] References Cited

U.S. PATENT DOCUMENTS

| | | | |
|---|---|---|---|
| 2,160,756 | 5/1939 | Schreck | 446/184 |
| 3,830,202 | 8/1974 | Garrison | 119/709 |
| 4,534,316 | 8/1985 | Bowlsby | 119/707 |
| 4,770,123 | 9/1988 | Bell | 119/709 |
| 4,924,811 | 5/1990 | Axelrod | 119/710 |
| 5,092,272 | 3/1992 | O'Rourke | 119/709 |
| 5,367,986 | 11/1994 | O'Rourke et al. | 119/709 |
| 5,392,734 | 2/1995 | Laone et al. | 119/710 |
| 5,467,741 | 11/1995 | O'Rourke | 119/710 |

*Primary Examiner*—Robert P. Swiatek
*Assistant Examiner*—Yvonne R. Abbott
*Attorney, Agent, or Firm*—Lyon & Lyon

[57] ABSTRACT

A play and chew toy for dogs comprising a rope portion and soft squeezable fleece portion carried by the rope portion. The rope portion of the toy defines a length of rope formed with a plurality of threads of a soft pliable material, preferably cotton, and defines a pair of knots tightly formed therein adjacent the extended ends of the rope. The fleece portion includes an outer shell of a soft material which encases a supply of soft synthetic fill material and extends about one of the knots on the rope. The shell is sewn about the shaft portion of the rope adjacent the knot therein so as to seal the shell about the fill material therein and secure the rope portion of the toy to the fleece portion.

4 Claims, 1 Drawing Sheet

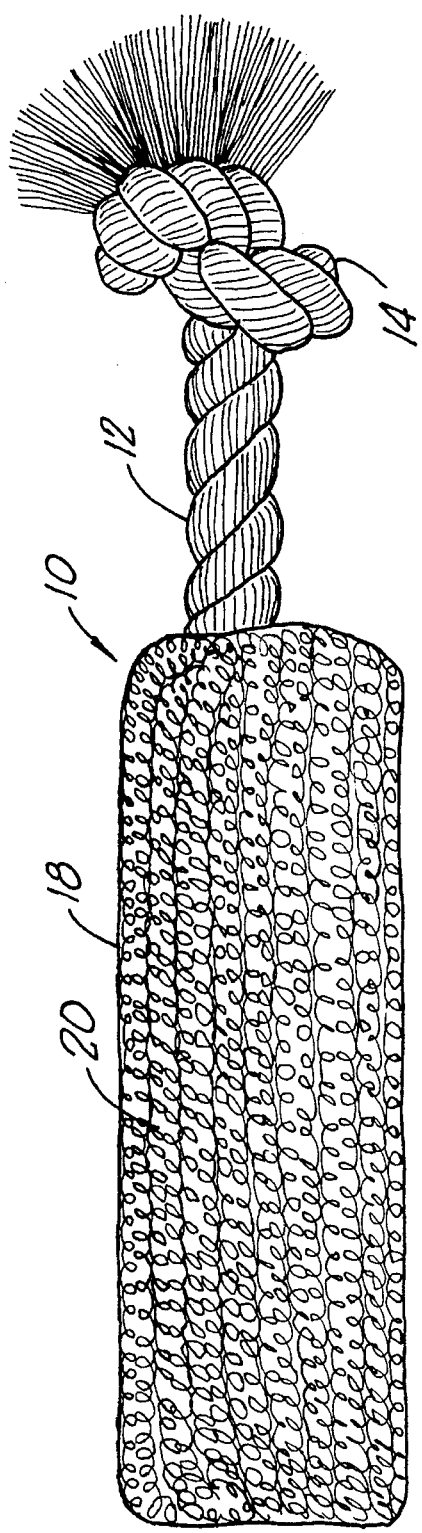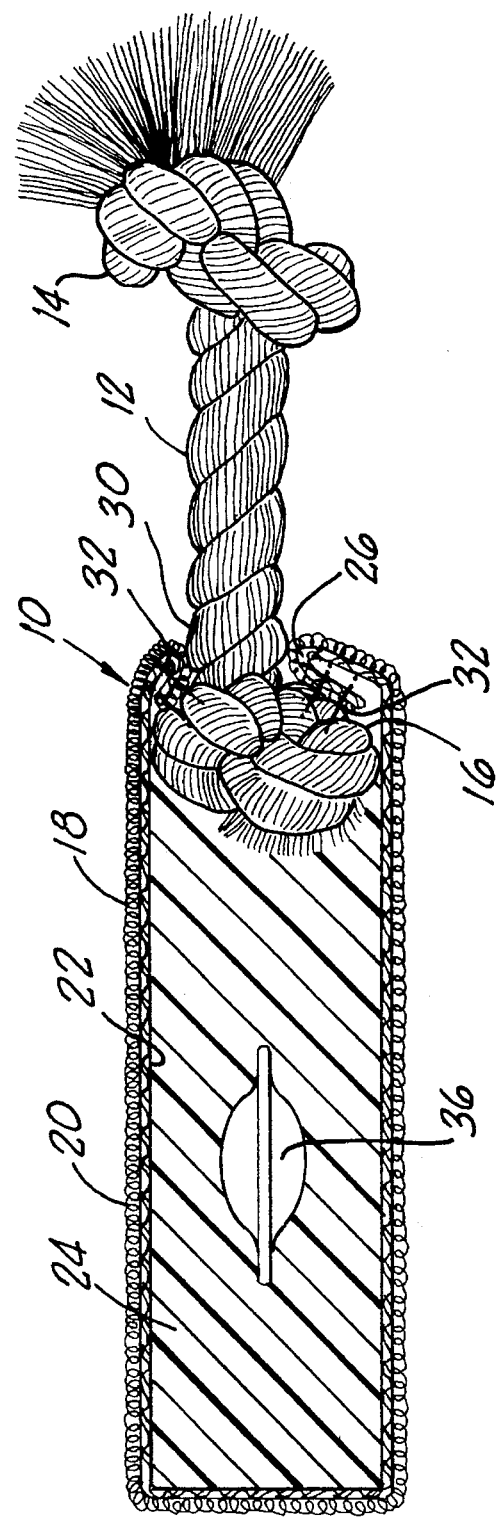

PLAY AND CHEW TOY FOR DOGS

BACKGROUND OF THE INVENTION

The present invention relates to a novel chew toy for dogs. Dogs chew toys are well-known and embody numerous different configurations and materials. One of the more popular of such toys was previously developed by applicant, Booda Products, Inc., and comprises a length of cotton rope having large knots near the ends thereof so as to resemble a classic dog bone configuration. The soft cotton rope provides a brushing effect and flossing of the dog's teeth as well as a gentle massaging of its gums when chewed and thus provides therapeutic benefits as well as playful enjoyment for the dog. Another popular dog toy is the fleece-type toy. Such toys are enjoyed for their softness and are typically formed with a synthetic fiber fill material encased in an outer shell comprising soft synthetic fibers carried on a pliably backing so as to simulate fleece. The chew toy of the present invention combines the enjoyable softness of the fleece toy with the therapeutic benefits of the cotton rope chew toy in a manner which further enhances the playfulness and beneficial enjoyment of the toy for the dogs while providing the manufacturer with an economical yet highly durable method of construction.

SUMMARY OF THE INVENTION

Briefly, the present invention is directed to a play and chew toy for dogs comprised of a therapeutic rope chewing portion and a playful soft fleece portion. The rope portion comprises a short length of rope formed of cotton or other soft pliable threads which has a pair of knots formed tightly therein adjacent the extended ends of the rope. The fleece portion of the toy is comprised of a soft outer skin formed of synthetic fibers carried by a flexible backing which is cut into a desired shape and encases a supply of synthetic fiber fill material. One of the knots on the rope portion of the toy is disposed with the backing of the fleece portion of the toy and the backing is sewn tightly about the adjacent shaft portion of the rope and preferably to the rope as well such that the rope projects from the fleece portion of the toy and is effectively secured thereto. So secured, the fleece portion of the toy provides a soft and attractive chew and cuddling toy while the projecting rope portion provides therapeutic benefits when chewed. In addition, the rope is positioned relative to the fleece portion of the toy so as to define an extended handle for the dog to grip in its mouth and playfully swing the toy from side to side without breaking the securement between the rope and fleece portion of the toy.

It is the principal object of the present invention to provide a play and chew toy for dogs which combines the playful and therapeutic benefits of fleece and rope chew toys in a synergistic manner so as to enhance the playful enjoyment derived by the dog playing with the toy and thus increase the therapeutic benefits resulting therefrom.

It is another object of the present invention to provide a play and chew toy for dogs which combines the playful and therapeutic benefits of fleece and rope play and chew toys in a configuration which is both highly durable and economical to manufacture.

These and other objects and advantages of the present invention will become readily apparent from the following detailed description taken in conjunction with the accompanying drawings.

DESCRIPTION OF THE PREFERRED EMBODIMENT IN THE DRAWINGS

FIG. 1 is side view of the play and chew toy of the present invention.

FIG. 2 is a partial sectional view of the chew toy of the present invention.

Referring now in detail to the drawings, the play and chew toy 10 of the present invention is comprised of a short length of rope 12 formed of cotton or other soft pliable threads and having knots 14 and 16 formed therein adjacent the extended ends of the rope. Knots 16 is secured within a soft, squeezable fleece portion 18 of toy 10. Fleece portion 18 comprises an outer skin formed of soft synthetic fibers 20 carried by a flexible backing 22 and disposed about a supply of synthetic fiber fill material 24. Thus, the fleece portion 18 of toy 10 has a very soft exterior for cuddling and is easily squeezed by a dog. To effect the securement between the rope 12 and the fleece portion 18 of toy 10, the fleece portion 18 defines an open end 26 through which the fiber fill materials 24 and knot 16 are inserted. After knot 16 is extended therethrough, the open end 26 of backing 22 is sewn together tightly about the shaft portion 30 of rope 12 adjacent knot 16, securing the knot 16 within the fleece portion of the toy and preventing separation of the fleece and rope portions of the toy. To strength this securement and prevent the fleece portion 18 of the toy from being pulled outwardly along shaft 30, the end 26 of backing 22 is also sewn to the rope 12. While the backing is shown in FIG. 2 as being sewn to knot 16 at 32, the backing could alternatively be sewn to the shaft portion 30 of rope 12. The backing could also be formed into any desired shape, such as a ball or animal, filled with a suitable soft material, and secured to the rope 12 as above-desired. A conventional "squeeker" 36 can be provided within the fleece portion 18 of the toy, as seen in FIG. 2, to emit a squeaky sound when squeezed and thereby enhance the attractiveness of the toy 10 for a dog.

In addition to providing a very durable and economical securement between the rope and fleece portions of the toy, the above-described construction provides a positional relationship between the rope and the fleece portions of the toy such that the rope portion thereof provides the dog with a handle for gripping the toy for playfully swinging the toy about its head and in so doing, increases the dog's enjoyment and thus use of the toy which in turn increases the therapeutic benefits.

Various changes and modifications may be made in carrying out the present invention without departing from the spirit and scope thereof. Insofar as these changes and modifications are within the purview of the appended claims, they are to be considered as part of the present invention.

I claim:

1. A play and chew toy for dogs comprising a length of rope formed with a plurality of threads of a soft pliable material and defining a pair of knots adjacent extended ends of the rope; an outer shell of a soft pliable material encasing a supply of soft fill material and one of said knots on said rope, said outer shell being secured tightly about a portion of said rope to secure said knot therein and prevent separation of said rope from said shell and fill material.

2. The toy of claim 1 wherein said shell is additionally secured to said rope to maintain said rope in a fixed disposition relative to said shell and filler material.

3. The toy of claim 1 including means for generating a noise upon being squeezed by a dog, said means being disposed adjacent said fill material within said shell.

4. The toy of claim 1 wherein said outer shell is comprised of a pliable synthetic backing and a plurality of soft pliable synthetic fibers carried by said backing.

* * * * *